July 3, 1923.
S. F. ARBUCKLE
1,460,835
PROCESS OF MAKING LIGHT DISTRIBUTORS AND MANUFACTURING THE SAME UNIFORMLY IN QUANTITIES
Filed April 11, 1922    2 Sheets-Sheet 1
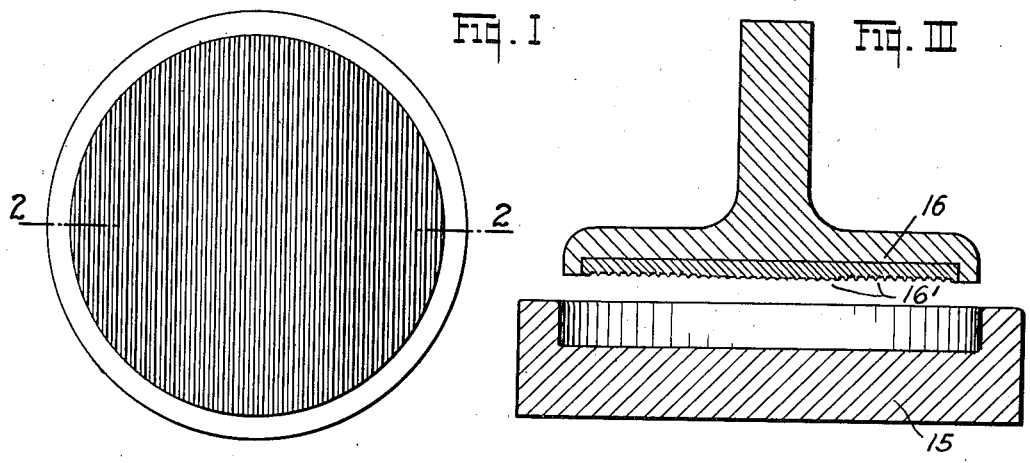
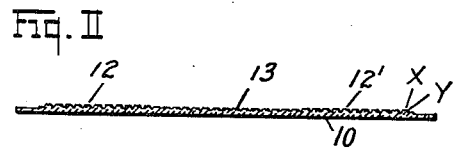
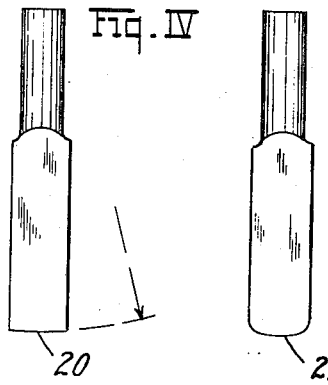
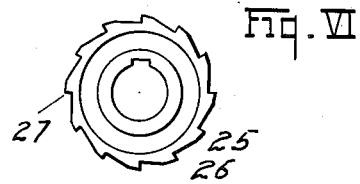
Inventor
Samuel F. Arbuckle
By his Attorney July 3, 1923.
S. F. ARBUCKLE
1,460,835
PROCESS OF MAKING LIGHT DISTRIBUTORS AND MANUFACTURING THE SAME UNIFORMLY IN QUANTITIES
Filed April 11, 1922    2 Sheets-Sheet 2
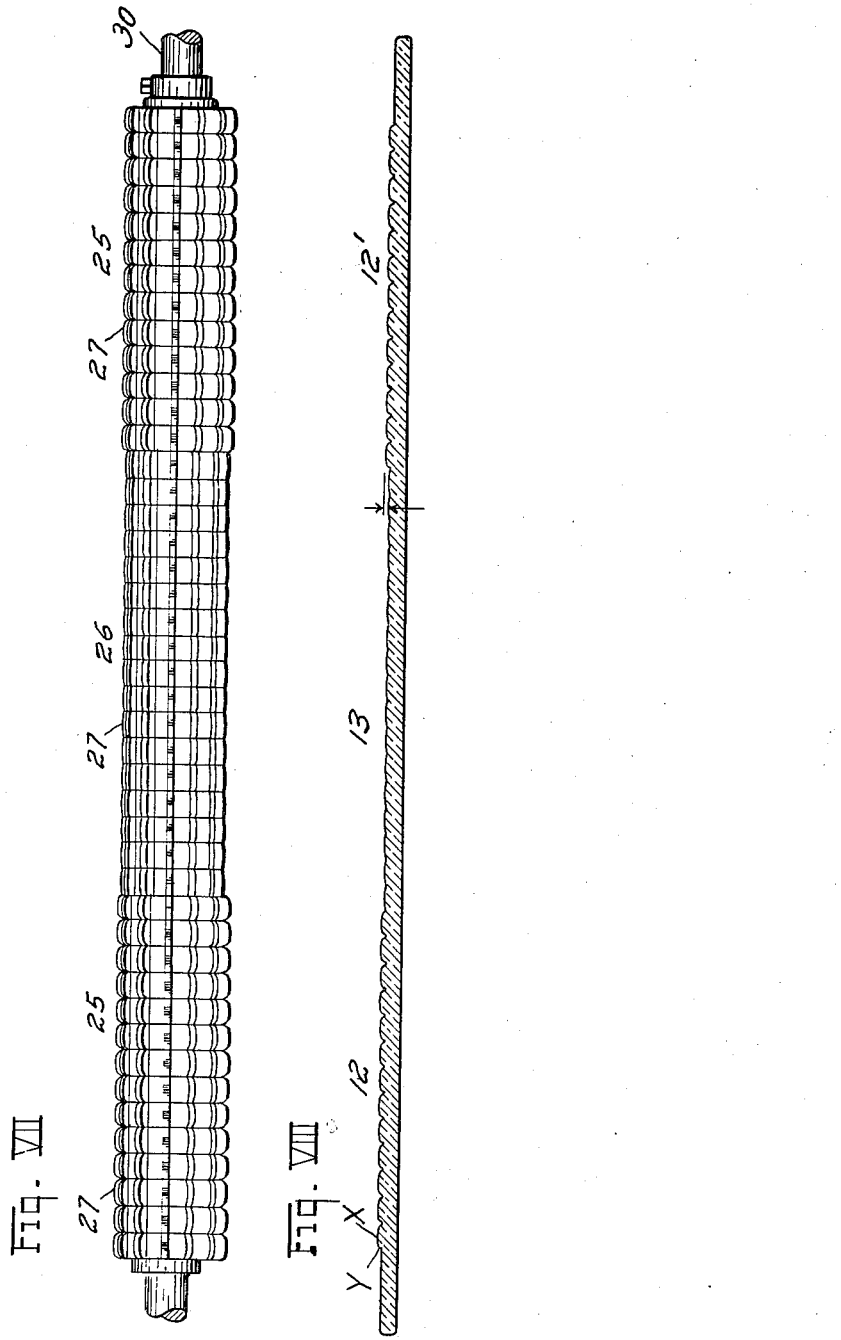
WITNESSES:
INVENTOR.
Samuel F. Arbuckle
BY
ATTORNEYS.

Patented July 3, 1923.

1,460,835

UNITED STATES PATENT OFFICE.

SAMUEL F. ARBUCKLE, OF DETROIT, MICHIGAN, ASSIGNOR TO MONOGRAM LENS CORPORATION, OF NEW YORK, N. Y., A CORPORATION OF DELAWARE.

PROCESS OF MAKING LIGHT DISTRIBUTORS AND MANUFACTURING THE SAME UNIFORMLY IN QUANTITIES.

Application filed April 11, 1922. Serial No. 551,645.

*To all whom it may concern:*

Be it known that I, SAMUEL F. ARBUCKLE, a citizen of the United States, residing at Detroit, in the county of Wayne and State of Michigan, have invented certain new and useful Improvements in Processes of Making Light Distributors and Manufacturing the Same Uniformly in Quantities, of which I declare the following to be a full, clear, and exact description.

This invention relates to a process of making molds for headlight lenses and method of maintaining a uniform product in quantity production.

An object of the invention is to provide a process in making a glass mould for making a headlight lens of a certain character to produce a predetermined spread of projected light from a source of illumination. I have discovered that by having a plurality of zones of refractive means such as ribs, lenses or vertical prisms, each rib in each zone having a predetermined and fixed radius of curvature which will refract portions of the light meeting each prism and permit forward projection of other portions on each prism of each zone, the deflection of the prisms in the different zones varying in the angle of refraction I can obtain a uniformly varying distribution of light over a desired area having extended side wings to illuminate the sides of a road, ditches, cross roads or the like, the central portion being of high intensity and the light gradually and uniformly diminishing therefrom to the tips of the wings on either side thereof.

I proceed by ascertaining in advance by the discovery referred to—by light projection through various lenses or prisms forming a certain shape to the forwardly projected light beam—the location, size and number of prisms for the given size lens to produce the required distribution of light and make a glass mould corresponding thereto as herein described.

The objects of this invention include a special method of manufacturing the mould which may advantageously be used in this process of making headlight lenses and includes a process of making a mould for moulding a headlight lens for example with parallel sets of prisms on one side thereof arranged to uniformly vary the light intensity from a central portion to an extended area on either side thereof which consists in providing a mould matrix material, in determining the required spread of light as aforesaid, and making a plurality of zones of different grooves in said matrix with a tool or sets of tools whose cutting edges accurately conform, one to the required prismatic contour for the prisms of one of said zones and another for other prisms of another zone for said lens; cutting said matrix material with said tools by a transverse movement thereof and forming one groove parallel to an adjacent groove when the latter is cut to thereby produce a moulding surface with a plurality of different prisms of different zones, the prisms of each zone having a predetermined curvature.

A further object of the invention is to maintain a given contour to the mould forming the prisms on the glass to a fine degree of accuracy by a polishing method which eliminates scale or other impurities which accumulate on the mould during use.

Further objects of the invention relate to the process of producing different size lenses which give substantially the same general spread of the forwardly projected light and to a method of varying the ratio of light intensity at the central portion of the lighted area compared with the extreme wings thereof and at the same time producing an extremely accurate and uniformly varying light intensity from the center to either wing or side area.

Fig. I of the drawing illustrates a lens made in accordance with this invention.

Fig. II is a cross sectional view taken on line 2—2 of Fig. I.

Fig. III illustrates more or less diagrammatically a mould from which the glass lenses are cast.

Figs. IV and V represent enlarged view of tools used in shaping the mould according to the present invention.

Fig. VI represents an enlarged view of a miller tool which may be employed;

Fig. VII is an enlarged side elevation of a plurality of millers assembled on an arbor for making a mould in one transverse action of the miller cutter, and Fig. VIII is a section to size of a completed lens.

Referring to Figs. I and II, it will be seen that the type of lens to be produced has a smooth front face 10 and a plurality of prisms all located on the other side of the glass. In order to secure the desired results, I provide a plurality of zones 12, 13 and 12′ (see Fig. VIII) made of a plurality of individual prisms having a predetermined contour or radius of curvature to produce the desired wide spread light projection of gradual variation of intensity predetermined by varying the light projection as aforesaid through lenses to give the required shape to the light beam. Each of the prisms is located substantially vertically on the lens and the prisms 12 in the particular embodiment hereof, have a double or compound curvature $x$ and $y$, determined by a short radius of 3/64ths of an inch for the portion $x$, and a longer radius of 5/16ths of an inch for the part $y$. The prisms 13 have a single curvature zone with a longer radius of 1½ inches making a very flat prism which will deflect only a small proportion of the light transmitted therethrough.

Fig. III illustrates diagrammatically the mould consisting of a receptacle 15 and a plunger 16 and since all the prisms are on one face only of the lens only one of the members 15 or 16 of the mould need be given a certain contour to produce the desired contour of the lens and the other member may be smooth.

Thus, I have illustrated the plunger matrix or die 16′ as being provided with a plurality of grooves forming the exact counterparts of the predetermined and required prisms 12, 12′ and 13 of the lens. This mould member may be made in various ways as by employing two sets of cutting tools 20 and 21 illustrated in enlarged view in Figures IV and V and individually planing each prism on the mould 16 accordingly.

Instead of employing the cutters 20 and 21 illustrated in Figs. IV and V, individual millers may be employed and the mould 16 may be made on a milling machine.

A particularly advantageous process of making the plunger 16 consists in forming a plurality of sets of millers 25 and 26, illustrated in Figs. VI and VII. In this case the rounded edge 27 of each tooth of each set of millers determines the shape of the concave recess made in the plunger 16. The millers 25 have a double curvature to give the prisms 12 and 12′, while the millers 26 have a small curve and produce the prisms 13. A plurality of millers 25 are assembled on either end of the arbor 30 illustrated in Fig. VII, whereas at the central portion a plurality of the other millers 26 are located and will form the central zone prisms 13. The cutting edges 27 of the millers 25 and 26 conform exactly to the shape desired for the prisms 12, 13 and 12′ and the millers 25 have a shorter radius than the millers 26, since the prisms 13 are not as high as the prisms 12 as shown in Fig. VIII.

With the assembled millers on the arbor 30, a milling machine is set in operation and in one transverse movement of the arbor 30 all of the prism forming concavities are produced in the material 16′ forming the plunger 16. Of course the cutters may be rearranged as desired and the prisms 13 located on the outside with the prisms 12 in the center. The zones 12 and 13, moreover, may not extend entirely across the lens, but other zoning of different prisms may be made as with circular concentric or eccentric portions.

In order to make a lens of different size but producing substantially the same distribution of light excepting for the size thereof, it is merely necessary to fill in the required added number of prisms maintaining substantially the same proportions as that illustrated in the lens of Figs. I and II, and this may be done by adding more millers 25 and 26 on the arbor 30 in the proportions required.

In order to vary the distribution of the light to increase or decrease the intensity at the center and decrease or increase the intensity on either wing, I have discovered that if the number of either or each set of millers 25 and 26 are varied accordingly, the various results may be obtained as desired as the millers 25 which make the prisms 12 and 12′ spread the light through the largest angle of refraction, at the wings of the projected light area and by increasing or decreasing the number of these prisms in proportion to the number of the other prisms, the change in light distribution is accordingly affected as desired.

An important feature of the present invention consists in maintaining the proper contour to the glass mould in use in producing lenses in large quantities. In the case illustrated, as a scale forms on the plunger 16, due to impurities in the glass, the mould wears upon continued use and a variation of a small fraction of an inch will cause a material variation in the distribution of light. In order, therefore, to maintain the proper contour to the plunger 16, I provide a polishing tool which consists in an exact male die conforming to and fitting through the female surface of the plunger. Such a tool may be made by assembling a plurality of elements similar to the tools illustrated in Figs. IV and V. Any means may be employed for reciprocating the built up matrix such as by employing a jig or fixture to which the assembled matrix is attached and reciprocating the same across the face of the mould with a suitable polishing compound interposed therebetween. By this process, I eliminate entirely the opportunity for error in individually grinding or polishing each particular concavity of the plunger 16 to eliminate the scale and to take up for wear.

Moreover, the required contour to the plunger 16 is accurately maintained and thus a large number of lenses may be manufactured from a single mould and an extremely uniformly accurate product produced in large quantities.

In addition, if the plunger becomes worn, the same may be put in the milling machine and the gang millers on the arbor 30 caused to traverse the same and take off enough metal to make a substantially new plunger 16.

It is apparent that, within the spirit of the invention, modifications and different arrangements may be made other than as herein disclosed, and the present disclosure is illustrative merely, the invention comprehending all variations illustrated.

Having thus described the invention, what I desire to secure by Letters Patent of the United States and claim is:

1. A process of making a mould for moulding a head light glass having a light refractive means extending across said glass, said process comprising providing a matrix material, predetermining the contour and relation of the refractive means to be produced in the glass, making a shaping tool with a cutting edge provided with a contour to form an impression on said matrix from which said light refractive means can be produced in said glass, and cutting the matrix with said tool to form a plurality of ribs or grooves in a reverse replica of said tool and arranging the same to have the predetermined relation, one with the other to make a complete mould.

2. A process of making a mould for a head-light lens having predetermined zones of different ribs extending across said lens comprising making a tool whose cutting edge is the positive shape of one of said ribs, making a second tool whose cutting edge is the positive shape of another of said ribs, cutting the mould with said tools to form the reverse replica of said tools to make the ribs of each zone and arranging the ribs and zones in said predetermined relation.

3. A process of making a headlight lens moulding matrix to give a lens with a uniformly varying spread of light intensity from a central portion to an extended portion on each side which consists in ascertaining and predetermining the location and size and contour of a plurality of vertically disposed light refracting ribs; making a cutting tool with cutting edge conforming to the shape of said ribs and cutting the matrix material to make a mould to conform to said predetermined contour.

4. A process of making a mould for moulding a headlight glass having light refractive means or ribs extending across said glass comprising, providing a matrix material, predetermining the contour and relation of the ribs, making a shaping tool with a cutting edge conforming to the positive contour of a rib, and cutting the matrix with said tool to form a plurality of grooves of the reverse replica of said shaping tool and arranging said grooves to have said predetermined relation one with the other.

5. A process of making a mould for moulding a headlight glass having a light refractive means extending across said glass, said process comprising providing a matrix material, predetermining the contour and relation of the refractive means to be produced in the glass, making a shaping tool with a cutting edge provided with a contour to form an impression on said matrix from which said light refractive means can be produced in said glass, and cutting the matrix with said tool to form a plurality of ribs or grooves in a reverse replica of said tool and arranging the same to have the predetermined relation, one with the other to have a complete mould and treating said groove matrix with a tool of the exact reverse contour thereof to recondition and polish the mould in use.

6. A process of reconditioning or polishing a mould of the character herein indicated to remove scale and impurities therefrom which comprises making a tool whose edge conforms exactly to the prismatic contour of the lens produced by said mould and causing relative transverse movement between said matrix, and said tool to form an exact contour of said tool in the reverse replica thereof in said matrix.

In testimony whereof, I affix my signature.

SAMUEL F. ARBUCKLE.